(12) United States Patent
Uehara

(10) Patent No.: US 7,368,404 B2
(45) Date of Patent: May 6, 2008

(54) OPTICAL GLASS

(75) Inventor: Susumu Uehara, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 496 days.

(21) Appl. No.: 10/973,734

(22) Filed: Oct. 26, 2004

(65) Prior Publication Data

US 2005/0107240 A1   May 19, 2005

(30) Foreign Application Priority Data

Nov. 17, 2003  (JP) ............... 2003-387164
Oct. 8, 2004   (JP) ............... 2004-295974

(51) Int. Cl.
*C03C 3/064* (2006.01)
*C03C 3/068* (2006.01)

(52) U.S. Cl. ......................... 501/78; 501/79

(58) Field of Classification Search ............... 501/78, 501/79, 64, 903
See application file for complete search history.

(56) References Cited

U.S. PATENT DOCUMENTS

| | | | |
|---|---|---|---|
| 4,111,707 A * | 9/1978 | Komorita et al. | 501/78 |
| 6,844,279 B2 * | 1/2005 | Hayashi et al. | 501/50 |
| 6,977,323 B1 * | 12/2005 | Swenson | 602/46 |
| 7,138,349 B2 * | 11/2006 | Uehara et al. | 501/78 |
| 2004/0235638 A1 | 11/2004 | Uehara et al. | |

FOREIGN PATENT DOCUMENTS

| | | |
|---|---|---|
| EP | 1 245 544 | 10/2002 |
| JP | 52-014607 | 2/1977 |
| JP | 54-090218 | 7/1979 |
| JP | 56-169150 | 12/1981 |
| JP | 62-100449 | * 5/1987 |
| JP | 06 305769 | 11/1994 |
| JP | 07-118033 | 5/1995 |
| JP | 08-026765 | 1/1996 |
| JP | 2002-128539 | 5/2002 |
| WO | WO 2004/054937 | 7/2004 |

OTHER PUBLICATIONS

EPO Search Report, Mar. 24, 2005.

* cited by examiner

*Primary Examiner*—Karl E Group
(74) *Attorney, Agent, or Firm*—James V. Costigan; Hedman & Costigan, P.C.

(57) ABSTRACT

An optical glass having a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C, containing, as essential components, $SiO_2$, $B_2O_3$, $La_2O_3$, $Gd_2O_3$, $Li_2O$ and F, and being substantially free of $As_2O_3$.

22 Claims, 1 Drawing Sheet

OPTICAL GLASS

BACKGROUND OF THE INVENTION

This invention relates to an optical glass and, more particularly, to an optical glass having a low glass transition temperature (Tg) and high refractive index and low dispersion characteristics, having excellent internal quality of glass and being suitable for reheat press molding or precision press molding.

One of characteristics required for an optical glass is an excellent internal quality (striae, bubbles and inclusions). The internal quality depends upon a glass composition in some cases and, in other cases, upon conditions of manufacturing the glass. For producing a highly homogeneous optical glass with a good yield in manufacturing an optical glass, a melting apparatus in which a part or whole of a portion which comes into contact with glass melt is made of platinum or platinum alloy is generally used. For example, a crucible, tank, stirring blade and axis made of platinum or platinum alloy are generally used. When melting of glass raw materials is made with such melting apparatus at a high melting temperature or over a long period of melting time, the amount of platinum melting out into the glass increases with the result that platinum or platinum alloy is recrystallized to precipitate in the glass as inclusions (crystals or devitrification) after supersaturation state, or platinum or platinum alloy comes off from the wall of the melting apparatus and becomes inclusions in the glass.

An optical glass which contains a large amount of rare earth oxides such as lanthanum oxide generally has a poor defoaming property and hence there is general tendency toward taking a long period of melting time for defoaming. As described above, inclusions in the glass increase under such melting condition. Accordingly, optical glasses containing a large amount of rare earth oxides such as lanthanum oxide tend to have insufficient internal quality such as bubbles and inclusions.

For overcoming the above described problem in the composition of glass, it is possible to add, as a refining agent, $As_2O_3$ which is very effective as a refining agent so as to defoam the glass at a relatively low temperature and thereby reduce the amount of inclusions. Since, however, $As_2O_3$ is a material which is detrimental to the environment, $As_2O_3$ has not been used recently.

There are spherical lenses and aspherical lenses as lenses used for constituting an optical system. Many spherical lenses are produced by lapping and polishing glass pressings obtained by reheat press molding glass materials. On the other hand, aspherical lenses are mainly produced by precision press molding, i.e., the method according to which lens performs which have been softened by heating are press molded with a mold having a high precision molding surface and the shape of the high precision molding surface of the mold is transferred to the lens performs.

In producing glass pressings by reheat press molding, a very high temperature is required and, therefore, a heat treating furnace is deteriorated in a relatively short period of time with resulting adverse effect to a stable production. Hence, the lower the viscous flow temperature of glass materials, i.e., the lower the glass transition temperature (Tg), the lower the temperature at which reheat press molding can be made with resulting reduction in the load to the heat treating furnace. It is well known in the art that "viscous flow temperature" is about the same as the glass transition temperature.

In obtaining glass moldings such as aspherical lenses by precision press molding, it is necessary to press lens performs which have been softened by heating in a high temperature environment for transferring the shape of the high precision molding surface of the mold to the lens performs and, therefore, the mold used for such precision press molding is subjected to a high temperature and, moreover, a high pressing force is applied to the mold. Hence, in heating and softening the lens performs and press molding the lens performs, the molding surface of the mold tends to be oxidized or eroded, or a release film provided on the molding surface tends to be damaged with the result that the high precision molding surface of the mold cannot be maintained or the mold itself tends to be damaged. In such a case, the mold must be replaced and, as a result, frequency of replacement of the mold increases and production of products at a low cost in a large scale thereby cannot be achieved. Accordingly, glasses used for precision press molding and glasses for glass performs used for precision press molding are desired to have the lowest possible glass transition temperature (Tg) from the standpoint of preventing such damage to the mold, maintaining the high precision molding surface of the mold for a long period of time and enabling precision press molding at a low pressing force.

For the above described reasons, there has been a strong demand in the industry for an optical glass which has, from the standpoint of usefulness in the optical design, high refractive index and low dispersion characteristics, a low glass transition temperature (Tg) and excellent internal quality.

Particularly, there is a strong demand for an optical glass with high refractive index and low dispersion characteristics having a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C (hereinafter referred to as "the specific range").

Since an optical glass having high refractive index and low dispersion characteristics is useful from the standpoint of the optical design, various glasses have been proposed for a long time in the past.

For example, Japanese Patent Application Laid-open Publication No. 2002-128539 discloses a high refractive index, low dispersion $B_2O_3$—$Ln_2O_3$ optical glass (where Ln is one or more metal selected from the group consisting of Y, La and Gd). Since, however, glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Sho 53-4023 discloses a high refractive index, low dispersion $B_2O_3$—$La_2O_3$—$HfO_2$ optical glass. Since, however, this glass contains very expensive $HfO_2$ as an essential component, the production cost of the glass is so high that it is not commercially practicable.

Japanese Patent Application Laid-open Publication No. Hei 8-217484 discloses a $B_2O_3$—$La_2O_3$—$Lu_2O_3$ optical glass. Since, however, this optical glass contains very expensive $Lu_2O_3$ as an essential component, the production cost of the glass is so high that it is not commercially practicable. Further, since glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Sho 55-3329 discloses a high refractive index, low dispersion $SiO_2$—$B_2O_3$—$La_2O_3$—$Yb_2O_3$—$SnO_2$ optical glass. Since, however, $SnO_2$ which is an essential component becomes metal tin when the melting atmosphere becomes a reduction state and is alloyed with platinum used in the melting apparatus thereby causing erosion which is likely to lead to leaking of glass. Hence, this glass is not commercially practicable. Further, since glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Sho 56-78447 discloses a high refractive index, low dispersion $SiO_2$—$B_2O_3$—$La_2O_3$—$Yb_2O_3$ optical glass. Since, however, this glass requires a high melting temperature of 1350° C. to 1600° C. in refining and homogenizing the glass, inclusions tend to occur in this glass. Further, although there are examples containing alkali oxides which can be melted at a relatively low temperature among specifically disclosed glasses in this publication, these glasses of the specific examples contain $As_2O_3$ which is detrimental to the environment. Furthermore, since glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Sho 52-14607 discloses a high refractive index, low dispersion $SiO_2$—$B_2O_3$—$La_2O_3$—$Gd_2O_3$—$ZrO_2$—$Ta_2O_5$ optical glass. Since glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Sho 59-169952 discloses a high refractive index, low dispersion $SiO_2$—$B_2O_3$—ZnO—$ZrO_2$ optical glass. However, all glasses but one that are specifically disclosed in this publication contain $As_2O_3$ which is detrimental to the environment.

Japanese Patent Application Laid-open Publication No. Sho 57-34044 discloses a high refractive index, low dispersion $B_2O_3$—$La_2O_3$—$Yb_2O_3$ optical glass. Since glasses having optical constants within the above described specific range which are disclosed specifically in this publication do not contain, or contain only a small amount of alkali components, ZnO or fluorine which is effective for making the glass transition temperature low, the glass transition temperature (Tg) of these glasses is high.

Japanese Patent Application Laid-open Publication No. Hei 8-259257 discloses a high refractive index, low dispersion $SiO_2$—$B_2O_3$—$Li_2O$—ZnO—$La_2O_3$ optical glass. Since glasses having optical constants within the above described specific range disclosed specifically in this publication contain $As_2O_3$ and, therefore, this glass is not desirable from the standpoint of environmental protection. Moreover, this glass has the disadvantage of producing inclusions.

Japanese Patent Application Laid-open Publication No. Hei 8-26765, No. Hei 6-305769, No. Sho 60-221338 and No. Sho 56-169150 disclose optical glasses which have a low glass transition point (Tg). However, glasses specifically disclosed in these publications do not have optical constants within the above described specific range and, therefore, cannot satisfy requirements for the optical design described above.

As described above, the known technical literature discloses only glasses which have a low glass transition point (Tg) but fail to satisfy the optical constants within the specific range or glasses which satisfy the optical constants within the specific range but have a high glass transition point (Tg) and, therefore, an optical glass which can satisfy an object of the present invention does not exist.

It is, therefore, an object of the present invention to provide an optical glass which has comprehensively overcome the disadvantages of the prior art optical glasses and has optical constants within the specific range, a low glass transition temperature (Tg), excellent internal quality and is suitable for reheat press molding or precision press molding.

SUMMARY OF THE INVENTION

Studies and experiments made by the inventor of the present invention for achieving the above described object of the invention have resulted in the finding, which has led to the present invention, that by adding specific amounts of $SiO_2$, $B_2O_3$, $La_2O_3$, $Gd_2O_3$, $Li_2O$ and F, an optical glass which has optical constants within the specific range, a low glass transition temperature (Tg), excellent internal quality and is suitable for reheat press molding or precision press molding.

In the first aspect of the invention, there is provided an optical glass having a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C, comprising, as essential components, $SiO_2$, $B_2O_3$, $La_2O_3$, $Gd_2O_3$, $Li_2O$ and F, and being substantially free of $As_2O_3$.

In the second aspect of the invention, there is provided an optical glass having a composition which comprises, calculated on oxide basis and expressed in mass %,

| | |
|---|---|
| $SiO_2$ | 0.1-less than 10% |
| $B_2O_3$ | 15-35% |

-continued

| | |
|---|---|
| $La_2O_3$ | 15-55% |
| $Gd_2O_3$ | 1-40% and |
| $Li_2O$ | 0.1-less than 3% and |
| $Y_2O_3$ | 0-2% and/or |
| $Yb_2O_3$ | 0-25% and/or |
| $GeO_2$ | 0-10% and/or |
| $TiO_2$ | 0-5% and/or |
| $ZrO_2$ | 0-10% and/or |
| $Nb_2O_5$ | 0-5% and/or |
| $Ta_2O_5$ | 0-10% and/or |
| $WO_3$ | 0-10% and/or |
| ZnO | 0-15% and/or |
| RO | 0-10% | where RO is one or more oxides selected from the group consisting of CaO, SrO and BaO and/or $Sb_2O_3$ 0-1% and a fluoride or fluorides of a metal element or elements contained in the above oxides, a total amount of F contained in the fluoride or fluorides being 0.1-10 weight parts to 100 weight parts of said composition calculated on oxide basis, and being substantially free of $As_2O_3$.

In the present specification and claims, the term "comprises, calculated on oxide basis" means that, assuming that oxides, complex salts, metal fluorides etc. which are used as raw materials of the glass components of the optical glass of the present invention have all been decomposed and converted to oxides during the melting process, each component of the glass comprises a particular ratio to the total weight of the converted oxides which is 100 mass %.

In the third aspect of the invention, there is provided an optical glass having a composition which comprises, calculated on the basis of all atoms constituting said composition and expressed in mol %,

| | |
|---|---|
| Si | 0.1-6 mol % |
| B | 12-32 mol % |
| La | 2-12 mol % |
| Gd | 0.2-8 mol % |
| Li | 0.1-6.5 mol % and |
| O | 40-65 mol % and |
| Y | 0-1 mol % and/or |
| Yb | 0-6 mol % and/or |
| Ge | 0-3.5 mol % and/or |
| Ti | 0-2 mol % and/or |
| Zr | 0-3 mol % and/or |
| Nb | 0-1 mol % and/or |
| Ta | 0-1.5 mol % and/or |
| W | 0-1.5 mol % and/or |
| Zn | 0-6 mol % and/or |
| Ca | 0-6 mol % and/or |
| Sr | 0-4 mol % and/or |
| Ba | 0-3 mol % and/or |
| Sb | 0-0.2 mol % and |
| F | 0.1-20 mol % | and being substantially free of As.

In expressing the composition of the optical glass of the present invention in mol % in the present specification and claims, ratio of amount of substance of each element to the total amount of substance of all elements existing in the optical glass is expressed in molar percentage.

In the fourth aspect of the invention, there is provided an optical glass as defined in the second or the third aspect of the invention having a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C.

In the fifth aspect of the invention, there is provided an optical glass as defined in any of the first to the fourth aspects of the invention wherein a value of $(Y_2O_3+Gd_2O_3+Yb_2O_3)/La_2O_3$ ($Y_2O_3$, $Gd_2O_3$, $Yb_2O_3$ and $La_2O_3$ in the formula representing amounts of the respective components calculated on oxide basis and expressed in mass %) is within a range from 0.4 to 2.

In the sixth aspect of the invention, there is provided an optical glass as defined in any of the first to the fifth aspects of the invention wherein a value of $(Li_2O+ZnO)/SiO_2$ ($Li_2O$, ZnO and $SiO_2$ in the formula representing amounts of the respective components calculated on oxide basis and expressed in mass %) is within a range from 0.05 to 7.

In the seventh aspect of the invention, there is provided an optical glass as defined in any of the first to the sixth aspects of the invention wherein a total amount of $SiO_2$, $B_2O_3$, $La_2O_3$, $Gd_2O_3$, $Li_2O$, $ZrO_2$, $Yb_2O_3$ and ZnO is 94 mass % or over.

In the eighth aspect of the invention, there is provided an optical glass as defined in any of the first to the seventh aspects of the invention wherein glass transition temperature (Tg) is within a range from 530° C. to 680° C.

In the present specification, "glass transition temperature (Tg)" means "glass transition temperature (Tg)" described in Japan Optical Glass Industry Standard JOGIS08-2003 (Method for measuring thermal expansion of optical glass). As a test piece used in the measuring method, specimens having length of 50 mm and diameter of 4 mm were used in the present invention.

In the ninth aspect of the invention, there is provided an optical glass as defined in any of the first to the seventh aspects of the invention wherein glass transition temperature (Tg) is within a range from 530° C. to 660° C.

In the tenth aspect of the invention, there is provided an optical glass as defined in any of the first to the seventh aspects of the invention wherein glass transition temperature (Tg) is within a range from 530° C. to 630° C.

In the eleventh aspect of the invention, there is provided an optical glass as defined in any of the first to the seventh aspects of the invention wherein glass transition temperature (Tg) is within a range from 530° C. to 610° C.

In the twelfth aspect of the invention, there is provided an optical glass as defined in any of the first to the eleventh aspect of the invention wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

In the thirteenth aspect of the invention, there is provided a lens preforml made of an optical glass as defined in any of the first to the twelfth aspects of the invention.

DESCRIPTION OF THE PREFERRED EMBODIMENTS

Figure 1:
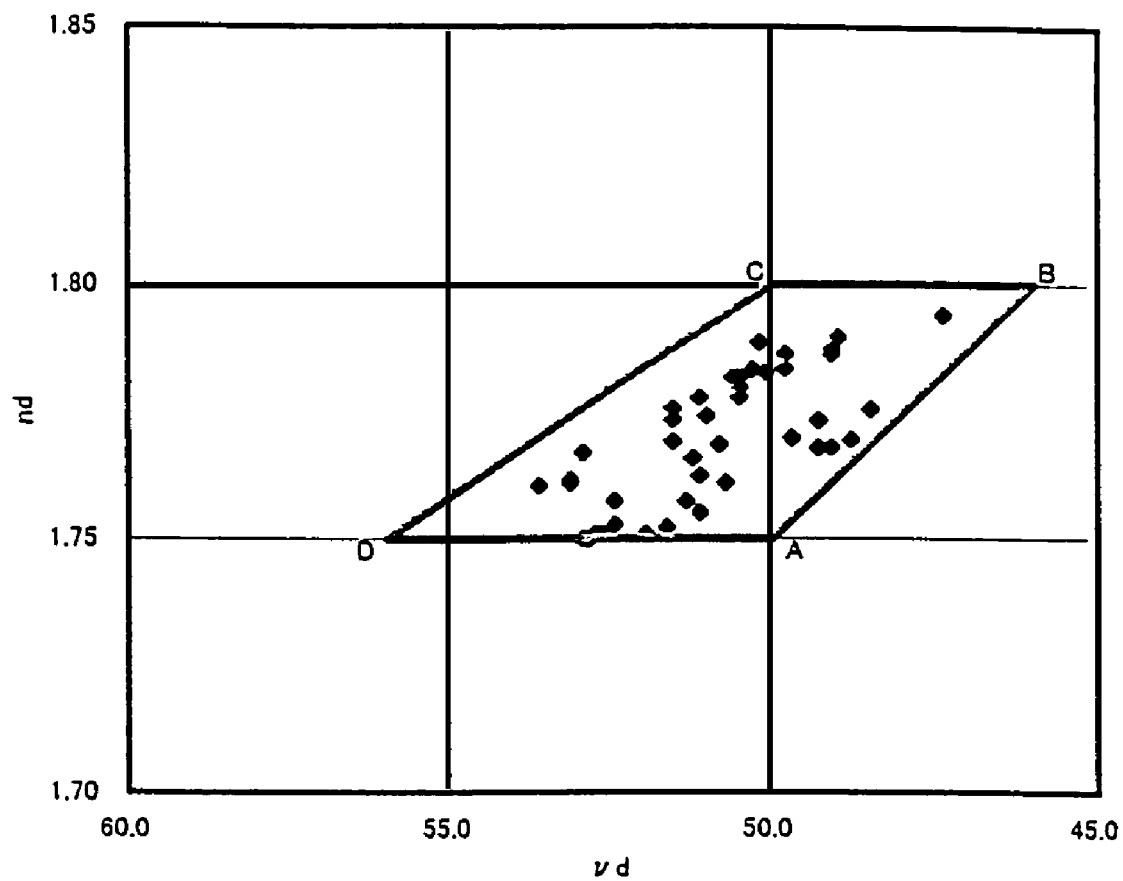
FIG. 1 is a graph showing x-y rectangular coordinates in which x coordinate represents Abbe number (vd) and y coordinate represents refractive index (nd) and which shows the range of the optical constants (Abbe number (vd) and refractive index (nd)) of the optical glass of the present invention. In the coordinates, points indicate values of the examples of the present invention.

Description will now be made about respective components of the optical glass of the present invention. The amount ratio of the respective components is expressed in mass % unless otherwise defined.

$SiO_2$ is effective for increasing viscosity of the glass and improving resistance to devitrification in the optical glass of the present invention. If the ratio of amount of this component to the entire mass of the glass calculated on oxide basis is less than 0.1%, these effects cannot be achieved sufficiently whereas if the amount of this component exceeds 10%, the glass transition temperature (Tg) and, therefore, the melting temperature is elevated with the result that inclusions tend to be produced and the internal quality of the glass thereby is deteriorated. Therefore, the lower limit of the ratio of this component to the entire mass of the glass calculated on oxide basis is 0.1%, more preferably 1% and, most preferably 1.5% and the upper limit thereof is less than 10%, more preferably 9% and, most preferably 8%.

$SiO_2$ may be introduced into the glass by using, for example, $SiO_2$ as a raw material.

In the optical glass of the present invention which basically is a lanthanum glass, $B_2O_3$ is an indispensable component as a glass forming oxide. If the the ratio of amount of this component to the entire mass of the glass calculated on oxide basis is less than 15%, resistance to devitrification becomes insufficient whereas if the amount of this component exceeds 35%, chemical durability of the glass is deteriorated. Therefore, the lower limit of the ratio of this component to the entire mass of the glass calculated on oxide basis is 15%, more preferably 16% and, most preferably 18% and the upper limit thereof is 35%, more preferably 33% and, most preferably 30%.

$B_2O_3$ may be introduced into the glass by using, for example, $H_3BO_3$ or $B_2O_3$ as a raw material.

$Y_2O_3$ is effective for increasing refractive index of the glass and imparting low dispersion characteristic to the glass. If the ratio of amount of this component to the entire mass of the glass calculated on oxide basis exceeds 2%, resistance to devitrification is sharply deteriorated. Therefore, the upper limit of the ratio of this component to the entire mass of the glass calculated on oxide basis is 2%, more preferably 1% and, most preferably the glass should not contain this component at all.

$Y_2O_3$ may be introduced into the glass by using, for example, $Y_2O_3$ or $YF_3$ as a raw material.

$La_2O_3$ is effective for increasing refractive index of the glass and imparting low dispersion characteristic to the glass and therefore is an indispensable component for the glass of the present invention which is a high refractive index and low dispersion glass. If the ratio of amount of this component to the entire mass of the glass calculated on oxide basis is less than 15%, it becomes difficult to maintain the optical constants within the specific range whereas if the amount of this component exceeds 55%, resistance to devitrification is deteriorated Therefore, the lower limit of the ratio of this component to the entire mass of the glass calculated on oxide basis is 15%, more preferably 18% and, most preferably 20% and the upper limit thereof is less than 55%, more preferably 53% and, most preferably 50%.

$La_2O_3$ may be introduced into the glass by using, for example, $La_2O_3$, lanthanum nitrate or its hydrate, or $LaF_3$ as a raw material.

$Gd_2O_3$ is effective for increasing refractive index of the glass and imparting low dispersion characteristic to the glass. If the ratio of amount of this component to the entire mass of the glass calculated on oxide basis is less than 1%, these effects cannot be achieved sufficiently whereas if the amount of this component exceeds 40%, resistance to devitrification is deteriorated. Therefore, the lower limit of the ratio of this component to the entire mass of the glass calculated on oxide basis is 1%, more preferably 3% and, most preferably 5% and the upper limit thereof is less than 40%, more preferably 38% and, most preferably 35%.

$Gd_2O_3$ may be introduced into the glass by using, for example, $Gd_2O_3$ or $GdF_3$ as a raw material.

$Yb_2O_3$ is effective for increasing refractive index of the glass and imparting low dispersion characteristic to the glass. If the ratio of amount of this component to the entire mass of the glass calculated on oxide basis exceeds 25%, resistance to devitrification is deteriorated. Therefore, the upper limit of the ratio of this component to the entire mass of the glass calculated on oxide basis is 25%, more preferably 24% and, most preferably 23%.

$Yb_2O_3$ may be introduced into the glass by using, for example, $Yb_2O_3$ or $YbF_3$ as a raw material.

$GeO_2$ is effective for increasing refractive index of the glass and improving resistance to devitrification. Since, however, the raw material of this component is very expensive, the upper limit of the ratio of this component to the entire mass of the glass calculated on oxide basis should be 10%, more preferably less than 2% and, most preferably the glass should not contain this component at all.

$GeO_2$ may be introduced into the glass by using, for example, $GeO_2$ as a raw material.

$TiO_2$ is effective for adjusting optical constants and improving resistance to devitrification. If the ratio of amount of this component to the entire mass of the glass calculated on oxide basis exceeds 5%, resistance to devitrification is deteriorated. Therefore, the upper limit of the ratio of this component to the entire mass of the glass calculated on oxide basis is 5%, more preferably 1% and, most preferably 0.5%.

$TiO_2$ may be introduced into the glass by using, for example, $TiO_2$ as a raw material.

$ZrO_2$ is effective for adjusting optical constants, improving resistance to devitrification and improving chemical durability. If the ratio of amount of this component to the entire mass of the glass calculated on oxide basis exceeds 10%, resistance to devitrification is deteriorated and it becomes difficult to maintain the glass transition temperature (Tg) within a desired low value. Therefore, the upper limit of the ratio of this component to the entire mass of the glass calculated on oxide basis is 10%, more preferably 9% and, most preferably 8%.

$ZrO_2$ may be introduced into the glass by using, for example, $ZrO_2$ or $ZrF_4$ as a raw material.

$Nb_2O_5$ is effective for increasing refractive index and improving chemical durability and resistance to devitrification. If the ratio of amount of this component to the entire mass of the glass calculated on oxide basis exceeds 5%, resistance to devitrification is deteriorated. Therefore, the upper limit of the ratio of this component to the entire mass of the glass calculated on oxide basis is 5%, more preferably 3.5% and, most preferably the glass should not contain this component at all.

$Nb_2O_5$ may be introduced into the glass by using, for example, $Nb_2O_5$ as a raw material.

$Ta_2O_5$ is effective for increasing refractive index and improving chemical durability and resistance to devitrification. If the ratio of amount of this component to the entire mass of the glass calculated on oxide basis exceeds 10%, it becomes difficult to maintain the optical constants within the specific range. Therefore, the upper limit of the ratio of this component to the entire mass of the glass calculated on oxide basis is 10%, more preferably 7.5% and, most preferably 6.5%.

$Ta_2O_5$ may be introduced into the glass by using, for example, $Ta_2O_5$ as a raw material.

$WO_3$ is effective for adjusting optical constants and improving resistance to devitrification. If the ratio of amount of this component to the entire mass of the glass calculated on oxide basis exceeds 10%, resistance to devitrification is deteriorated and light transmittance in short wavelength side of the visible ray region also is deteriorated. Therefore, the upper limit of the ratio of this component to the entire mass of the glass calculated on oxide basis is 10%, more preferably less than 0.5% and, most preferably the glass should not contain this component at all.

$WO_3$ may be introduced into the glass by using, for example, $WO_3$ as a raw material.

ZnO is effective for lowering the glass transition temperature (Tg). If the ratio of amount of this component to the entire mass of the glass calculated on oxide basis exceeds 15%, resistance to devitrification is deteriorated. Therefore, the upper limit of the ratio of this component to the entire mass of the glass calculated on oxide basis is 15%, more preferably 13% and, most preferably 10%.

ZnO may be introduced into the glass by using, for example, ZnO or $ZnF_2$ as a raw material.

RO component (one or more oxides selected from the group consisting of CaO, SrO and BaO) is effective for adjusting optical constants. If the ratio of amount of this component to the entire mass of the glass calculated on oxide basis exceeds 10%, resistance to devitrification is deteriorated. Therefore, the upper limit of the ratio of this component to the entire mass of the glass calculated on oxide basis is 10%, more preferably 6% and, most preferably 4.5%.

RO component may be introduced into the glass by using, for example, CaO, SrO, BaO or its carbonate, nitrate, fluoride or hydroxide as a raw material. It is preferable that the glass should not substantially contain SrO or CaO.

$Li_2O$ is effective for lowering the glass transition temperature (Tg) significantly and enhancing melting of mixed raw materials. If the ratio of amount of this component to the entire mass of the glass calculated on oxide basis is less than 0.1%, these effects cannot be achieved sufficiently whereas if the amount of this component is 3% or over, resistance to devitrification is sharply deteriorated. Therefore, the lower limit of the ratio of this component to the entire mass of the glass calculated on oxide basis is 0.1%, more preferably more than 0.1% and, most preferably 0.15% and the upper limit thereof is less than 3%, more preferably 2.5% and, most preferably less than 2.5%.

$Li_2O$ may be introduced into the glass by using, for example, $Li_2O$, $Li_2CO_3$, LiF, LiOH or $LiNO_3$ as a raw material.

$Sb_2O_3$ may be optionally added for refining during melting of the glass. If an excessive amount of this component is added, light transmittance in short wavelength side of the visible ray region is deteriorated. Therefore, the upper limit of the ratio of this component to the entire mass of the glass calculated on oxide basis is 1%, more preferably 0.6% and, most preferably 0.4%.

F is effective for enhancing melting. of mixed glass materials, lowering the glass transition temperature (Tg) while imparting low dispersion characteristic to the glass and improving resistance to devitrification. Particularly, F is a very important component in the finding that, by having F coexist with $La_2O_3$, a high refractive index, low dispersion optical glass having optical constants within the specific range and a low glass transition temperature (Tg) can be obtained. The addition of F generally imparts low dispersion characteristic to a glass but it also generally increases refractive-index of the glass. It is particularly important that the high refractive index within the specific range is maintained in the present invention by coexistence of F and $La_2O_3$.

F may be introduced into the glass by using, for example, $YF_3$, $LaF_3$, $GdF_3$, $YbF_3$, $ZrF_4$, $ZnF_2$, fluoride of alkali metal or fluoride of alkaline earth metal.

In the glass composition of the present invention, F exists in the form of a fluoride or fluorides of a metal element or elements contained in oxides. If a total amount of F contained in the fluoride or fluorides is less than 0.1 weight part to 100 weight parts of the composition calculated on oxide basis, the above described effects of F cannot be achieved sufficiently whereas if the total amount of F exceeds 10 weight parts, the amount of evaporation of F increases significantly with resulting difficulty in obtaining a homogeneous glass. Therefore, the lower limit of the ratio of this component to the entire mass of the glass calculated on oxide basis is 0.1 weight part, more preferably 0.5 weight part and, most preferably 1 weight part and the upper limit thereof is 10 weight parts, more preferably less than 10 weight parts and, most preferably 9.5 weight parts.

The above raw materials used for introducing F into the glass are described for illustrative purpose only and raw materials for F component are not limited to the above described oxides and fluorides. The raw material therefore may be selected from among known materials in accordance with modification of conditions for manufacturing the glass.

The inventor of the present invention has found that, by determining ratio of the total amount of $Y_2O_3$, $Gd_2O_3$ and $Yb_2O_3$ to the amount of $La_2O_3$, i.e., $(Y_2O_3+Gd_2O_3+Yb_2O_3)/La_2O_3$ in the optical constants of the specific range within a specific range, liquidus temperature of the glass can be lowered significantly. That is, by determining this value within a range from 0.4 to 2, the melting temperature can be lowered and the amount of inclusions produced can thereby be reduced significantly.

In the present invention, therefore, the lower limit of the value of $(Y_2O_3+Gd_2O_3+Yb_2O_3)/La_2O_3$ is 0.4, more preferably 0.5 and, most preferably 0.55 and the upper limit thereof is 2, more preferably 1.5 and, most preferably 1.27.

Further, the inventor of the present invention has found that, by determining ratio of the total amount of $Li_2O$ and ZnO to the amount of $SiO_2$, i.e., $(Li_2O+ZnO)/SiO_2$ in the optical constants of the specific range within a specific range, melting temperature can be lowered significantly and the amount of inclusions produced can thereby be reduced significantly.

In the present invention, therefore, the lower limit of the value of $(Li_2O+ZnO)/SiO_2$ is 0.05, more preferably 0.1 and, most preferably 0.15 and the upper limit thereof is 7, more preferably 4 and, most preferably 3.

Further, the inventor of the present invention has found that, by determining values of value of $(Y_2O_3+Gd_2O_3+Yb_2O_3)/La_2O_3$ and $(Li_2O+ZnO)/SiO_2$ within the above described specific ranges simultaneously, the amount of inclusions produced can be lowered particularly significantly.

The inventor of the present invention has also found that making the total amount of $SiO_2$, $B_2O_3$, $La_2O_3$, $Gd_2O_3$, $Li_2O$, $ZrO_2$, $Yb_2O_3$ and ZnO 94 mass % or over contributes sufficiently to achieving a glass having the optical constants in the specific range, lowering the glass transition temperature (Tg) of the glass and reducing the amount of inclusions in the glass. For achieving these effects, the total amount of $SiO_2$, $B_2O_3$, $La_2O_3$, $Gd_2O_3$, $Li_2O$, $ZrO_2$, $Yb_2O_3$ and ZnO should be 94 mass % or over, more preferably 95 mass % or over and, most preferably 98 mass % or over.

$Al_2O_3$ is effective for improving chemical durability. If the ratio of amount of this component to the entire mass of the glass calculated on oxide basis exceeds 3%, resistance to devitrification is sharply deteriorated. Therefore, the upper limit of the ratio of this component to the entire mass of the glass calculated on oxide basis is 3%, more preferably 1% and, most preferably the glass should not contain this component at all.

It is possible to add one or more of $Lu_2O_3$, $Hf_2O_3$, $SnO_2$, $Ga_2O_3$, $Bi_2O_3$ and BeO to the glass of the present invention. $Lu_2O_3$, $Hf_2O_3$ and $Ga_2O_3$, however, are expensive materials and therefore it is not practicable to use these materials in actual production due to high cost of materials. $SnO_2$ has the problem that, when glass materials are melted in a platinum crucible or a melting furnace in which a portion coming into contact with melting glass is made of platinum, there is likelihood that tin is alloyed with platinum and heat resistance in the alloyed portion is deteriorated with the result that a hole is opened in this portion and glass leaks out of the hole. $Bi_2O_3$ and BeO are oxides which are seriously detrimental to the environment. Therefore, the upper limit of the ratio of each of these components to the entire mass of the glass calculated on oxide basis should be less than 0.1%, more preferably 0.05% and, most preferably the glass should not contain this component at all.

Description will now be made about materials which should not be added to the optical glass of the present invention.

A lead compound has the problem that it tends to be fused with the mold in precision press molding and also has the problem that it is detrimental to the environment and therefore care must be taken for environmental protection not only in the manufacture of the glass but also in cold processing of the glass such as polishing and even in disposing it as a waste. This compound should therefore not be added to the optical glass of the present invention.

$As_2O_3$, cadmium and thorium are seriously detrimental to the environment and therefore should not be added to the optical glass of the present invention.

$P_2O_5$ tends to deteriorate resistance to devitrification if it is added to the optical glass of the present invention and, therefore, it is not preferable to add this material.

$TeO_2$ has the problem that, when, in glass materials are melted in a platinum crucible or a melting furnace in which a portion coming into contact with melting glass is made of platinum, there is likelihood that tellurium is alloyed with platinum and heat resistance in the alloyed portion is deteriorated with the result that a hole is opened in this portion and glass leaks out of the hole. Therefore, this material should not be added to the optical glass of the present invention.

In the optical glass of the present invention, it is preferable not to contain a coloring agent such as V, Cr, Mn, Fe, Co, Ni, Cu, Mo, Eu, Nd, Sm, Tb, Dy and Er. In this case, "not to contain" means not to add intentionally and a case where such material is mixed in the glass as an impurity is excluded.

Since the glass composition of the optical glass of the present invention is expressed in mass %, it cannot be expressed directly in mol %. The amount of each element of the glass composition for satisfying the properties required for the optical glass is approximately expressed in mol % as follows:

Si 0.1-6 mol %, B 12-32 mol %, La 2-12 mol %, Gd 0.2-8 mol %, Li 0.1-6.5 mol %, O 40-65 mol %, Y 0-1 mol %, Yb 0-6 mol %; Ge 0-3.5 mol %. Ti 0-2 mol %, Zr 0-3 mol %, Nb 0-1 mol %, Ta 0-1.5 mol %, W 0-1.5 mol %, Zn 0-6 mol %, Ca 0-6 mol %, Sr 0-4 mol %, Ba 0-3 mol %, Sb 0-0.2 mol %, F 0.1-20 mol %

In the optical glass of the present invention, Si is added because it is effective for increasing viscosity of the glass and improving resistance to devitrification. The upper limit of this element is 6 mol %, more preferably less than 6 mol % and, most preferably be 5.5 mol % and the lower limit of this element is 0.1 mol %, more preferably 0.2 mol % and, most preferably 0.5 mol %.

In the optical glass of the present invention, B is added because it is an indispensable element for glass forming and is effective for improving resistance to devitrification. The upper limit of this element is 32 mol %, more preferably 30 mol % and, most preferably be 28 mol % and the lower limit of this element is 12 mol %, more preferably 13 mol % and, most preferably 15 mol %.

In the optical glass of the present invention, Y may be added because it is effective for increasing refractive index and imparting low dispersion characteristic to the glass. The upper limit of this element is 1 mol %, more preferably 0.8 mol % and, most preferably the glass should not contain this element at all.

In the optical glass of the present invention, La is added because it is effective for increasing refractive index of the glass and imparting low dispersion characteristic to the glass. The upper limit of this element is 12 mol %, more preferably less than 12 mol % and, most preferably be 11.5 mol % and the lower limit of this element is 2 mol %, more preferably more than 2 mol % and, most preferably 2.5 mol %.

In the optical glass of the present invention, Gd is added because it is effective for increasing refractive index of the glass and imparting low dispersion characteristic to the glass. The upper limit of this element is 8 mol %, more preferably less than 7.5 mol % and, most preferably be 7 mol % and the lower limit of this element is 0.2 mol %, more preferably 0.3 mol % and, most preferably 0.5 mol %.

In the optical glass of the present invention, Yb is added because it is effective for increasing refractive index of the glass and imparting low dispersion characteristic to the glass. The upper limit of this element is 6 mol %, more preferably 5.5 mol % and, most preferably 5 mol %.

In the optical glass of the present invention, Ge is added because it is effective for increasing refractive index of the glass and imparting low dispersion characteristic to the glass. The upper limit of this element is 3.5 mol %, more preferably 3 mol % and, most preferably the glass should not contain this element at all.

In the optical glass of the present invention, Ti is added because it is effective for adjusting optical constants and improving resistance to devitrification. The upper limit of this element is 2 mol %, more preferably 1 mol % and, most preferably 0.5 mol %.

In the optical glass of the present invention, Zr is added because it is effective for adjusting optical constants and improving resistance to devitrification. The upper limit of this element is 3 mol %, more preferably 2.5 mol % and, most preferably 2 mol %.

In the optical glass of the present invention, Nb is added because it is effective for increasing refractive index and improving chemical durability and resistance to devitrification. The upper limit of this element is 1 mol %, more preferably 0.8 mol % and, most preferably the glass should not contain this element at all.

In the optical glass of the present invention, Ta is added because it is effective for increasing refractive index and improving chemical durability and resistance to devitrification. The upper limit of this element is 1.5 mol %, more preferably 1.3 mol % and, most preferably be 1 mol %.

In the optical glass of the present invention, W is added because it is effective for adjusting optical constants and improving resistance to devitrification. The upper limit of this element is 1.5 mol %, more preferably 1 mol % and, most preferably the glass should not contain this element at all.

In the optical glass of the present invention, Zn is added because it is effective for lowering the glass transition temperature (Tg). The upper limit of this element is 6 mol %, more preferably 5.5 mol % and, most preferably be 5 mol %.

In the optical glass of the present invention, Ca is added because it is effective for adjusting optical constants. The upper limit of this element is 6 mol %, more preferably 5 mol % and, most preferably be 4 mol %.

In the optical glass of the present invention, Sr is added because it is effective for adjusting optical constants. The upper limit of this element is 4 mol %, more preferably 3 mol % and, most preferably be 2 mol %.

In the optical glass of the present invention, Ba is added because it is effective for adjusting optical constants. The upper limit of this element is 3 mol %, more preferably 2.5 mol % and, most preferably be 2 mol %.

In the optical glass of the present invention, Li is added because it is effective for significantly lowering the glass transition temperature (Tg) and enhancing melting of mixed glass raw materials. The upper limit of this element is 6.5 mol %, more preferably 6 mol % and, most preferably be 5.5 mol % and the lower limit of this element is 0.1 mol %, more preferably more than 0.1 mol % and, most preferably 0.15 mol %.

In the optical glass of the present invention, Sb is added because it is effective for refining the glass during the melting process. The upper limit of this element is 0.2 mol %, more preferably 0.15 mol % and, most preferably 0.1 mol %.

In the optical glass of the present invention, F is added because it is effective for enhancing melting of mixed glass raw materials, lowering the glass transition temperature (Tg) while imparting low dispersion characteristic to the glass and improving resistance to devitrification. The upper limit of this element is 20 mol %, more preferably 19 mol % and, most preferably be 18 mol % and the lower limit of this element is 0.1 mol %, more preferably 0.5 mol % and, most preferably 1 mol %.

Since As, cadmium and thorium are detrimental to the environment, these elements should not be added to the optical glass of the present invention.

Description will now be made about properties of the optical glass of the present invention.

As described above, the optical glass of the present has, from the standpoint of usefulness in the optical design, a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C. Preferably, the optical glass of the present invention has a refractive index (nd) and Abbe number (vd) within a range enclosed with a border line consisting of straight lines connecting point A (nd being 1.75 and vd being 50.0), point B (nd being 1.80 and vd being 48.0), point C (nd being 1.80 and vd being 50.0) and point D (nd being 1.75 and vd being 55.0) in the order of the point A, the point B, the point C, the point D and the point A in the same coordinates, including refractive index (nd) and Abbe number (vd) on the border line except for the straight line connecting the point A with the point D and the straight line connecting the point B with the point C.

More preferably, the optical constants of the optical glass should be within a range in which nd is higher than 1.75 and not higher than 1.78 and vd is 50.0-53.5. Most preferably, the optical constants should be within a range in which nd is higher than 1.75 and not higher than 1.77 and vd is 50.0-53.5.

As to bubbles in the glass, classification according to sum (mm$^2$) of cross sections of bubbles contained in glass of 100 ml shown in Table 1 of Japan Optical Glass Industry Standard JOGIS12-1994 (Measuring method for bubbles in optical glass) should be Class 1 to Class 4, more preferably Class 1 to Class 3 and, most preferably, Class 1 to Class 2. As to inclusions, classification according to sum of cross sections of inclusions contained in glass of 100 ml shown in Table 1 of Japan Optical Glass Industry Standard JOGIS12-1994 (Measuring method for inclusions in optical glass) should be Class 1 to Class 4, more preferably Class 1 to Class 3 and, most preferably Class 1 to Class 2.

EXAMPLES

Description will now be made about examples of the present invention. It should be noted that the scope of the present invention is not limited by these examples.

Compositions of examples of the present invention (Example No. 1 to No. 53) are shown in Tables 1 to 6 together with refractive index (nd), Abbe number (vd), glass transition temperature (Tg) and result of foreign matter rating (Class) of these examples. In the tables, composition of the respective components is expressed in mass %.

Likewise, compositions of comparative examples of the present invention (No. A to No. F) are shown in Table 7 together with refractive index (nd), Abbe number (vd), glass transition temperature (Tg) and result of foreign matter rating (Class) of these comparative examples.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 4.54 | 4.58 | 4.59 | 4.58 | 2.03 | 2.92 | 5.46 | 2.41 | 2.41 | 2.72 |
| $B_2O_3$ | 24.20 | 23.39 | 20.81 | 21.79 | 21.86 | 25.64 | 22.69 | 25.74 | 25.74 | 25.74 |
| $Y_2O_3$ | | | | | | 1.23 | 1.23 | 1.23 | 1.23 | 1.23 |
| $La_2O_3$ | 29.81 | 28.19 | 26.57 | 27.70 | 25.73 | 30.21 | 30.21 | 33.27 | 31.74 | 30.21 |
| $Gd_2O_3$ | 23.50 | 23.70 | 23.76 | 26.78 | 27.45 | 28.97 | 28.97 | 28.97 | 28.97 | 28.97 |
| $Yb_2O_3$ | 2.52 | 2.54 | 2.55 | 2.55 | | | | | | |
| $TiO_2$ | 0.05 | 0.05 | 0.05 | 0.05 | | | | | | |
| $ZrO_2$ | 5.04 | 5.09 | 5.10 | 5.09 | 6.10 | 6.14 | 6.14 | 3.09 | 6.14 | 6.14 |
| $Nb_2O_5$ | | | | | | | | | | |
| $Ta_2O_5$ | 2.22 | 4.27 | 2.24 | 3.26 | 4.07 | 3.75 | 3.75 | 3.75 | 2.23 | 3.75 |
| $WO_3$ | | | | | | | | | | |
| ZnO | 6.56 | 6.61 | 12.75 | 6.62 | 12.20 | 0.99 | 0.99 | 0.99 | 0.99 | 0.99 |
| CaO | | | | | | | | | | |
| SrO | | | | | | | | | | |
| BaO | | | | | | | | | | |
| $Li_2O$ | 1.51 | 1.53 | 1.53 | 1.53 | 0.51 | 0.10 | 0.51 | 0.51 | 0.51 | 0.20 |
| $Sb_2O_3$ | 0.05 | 0.05 | 0.05 | 0.05 | 0.05 | 0.04 | 0.04 | 0.04 | 0.04 | 0.04 |
| $GeO_2$ | | | | | | | | | | |
| Total(%) | 100 | 100 | 100 | 100 | 100 | 100 | 100 | 100 | 100 | 100 |
| F | 1.47 | 2.96 | 3.44 | 3.14 | 2.96 | 2.96 | 2.96 | 2.96 | 2.96 | 2.96 |
| $(Y_2O_3 + Gd_2O_3 + Yb_2O_3)/La_2O_3$ | 0.87 | 0.93 | 0.99 | 1.06 | 1.07 | 1.00 | 1.00 | 0.91 | 0.95 | 1.00 |
| $(Li_2O + ZnO)/SiO_2$ | 1.78 | 1.78 | 3.11 | 1.78 | 6.26 | 0.37 | 0.27 | 0.62 | 0.62 | 0.44 |
| $SiO_2 + B_2O_3 + La_2O_3 + Gd_2O_3 + Li_2O + ZrO_2 + Yb_2O_3 + ZnO$ | 97.68 | 95.63 | 97.66 | 96.64 | 95.88 | 94.97 | 94.98 | 94.98 | 96.50 | 94.98 |
| $n_d$ | 1.770 | 1.768 | 1.769 | 1.773 | 1.794 | 1.790 | 1.786 | 1.783 | 1.786 | 1.787 |
| $v_d$ | 49.7 | 49.3 | 48.8 | 49.3 | 47.4 | 49.0 | 49.1 | 50.1 | 49.8 | 49.1 |
| $T_g$ (° C.) | 583 | 572 | 549 | 570 | 580 | 665 | 645 | 635 | 638 | 652 |
| Inclusions rating (Class) | 1 | 1 | 1 | 1 | 1 | 1 | 1 | 1 | 1 | 1 |

TABLE 2

| | Example No. | | | | | | | | | |
|---|---|---|---|---|---|---|---|---|---|---|
| | 11 | 12 | 13 | 14 | 15 | 16 | 17 | 18 | 19 | 20 |
| $SiO_2$ | 2.43 | 2.74 | 2.74 | 2.74 | 2.74 | 2.74 | 2.74 | 2.74 | 2.74 | 2.81 |
| $B_2O_3$ | 25.97 | 25.97 | 25.97 | 25.97 | 25.97 | 25.97 | 25.97 | 25.97 | 25.97 | 26.66 |
| $Y_2O_3$ | 1.24 | 1.24 | 1.24 | | | | | | | |
| $La_2O_3$ | 29.61 | 33.40 | 35.45 | 34.64 | 28.27 | 39.77 | 33.40 | 39.77 | 35.49 | 44.31 |
| $Gd_2O_3$ | 29.22 | 29.22 | 29.22 | 29.22 | 30.46 | 18.96 | 15.07 | 13.83 | 17.12 | 12.31 |
| $Yb_2O_3$ | | | | | 5.13 | 5.13 | 15.39 | 10.26 | 17.44 | 12.64 |
| $TiO_2$ | | | | | | | | | | |
| $ZrO_2$ | 6.20 | 6.20 | 4.14 | 6.20 | 6.20 | 6.20 | 6.20 | 6.20 | | |
| $Nb_2O_5$ | | | | | | | | | | |
| $Ta_2O_5$ | 3.79 | | | | | | | | | |
| $WO_3$ | | | | | | | | | | |
| ZnO | 1.00 | 1.00 | 1.00 | 1.00 | 1.00 | 1.00 | 1.00 | 1.00 | 1.00 | 1.02 |
| CaO | | | | | | | | | | |
| SrO | | | | | | | | | | |
| BaO | | | | | | | | | | |
| $Li_2O$ | 0.51 | 0.21 | 0.21 | 0.21 | 0.21 | 0.21 | 0.21 | 0.21 | 0.21 | 0.21 |
| $Sb_2O_3$ | 0.04 | 0.04 | 0.04 | 0.04 | 0.04 | 0.04 | 0.04 | 0.04 | 0.04 | 0.04 |
| $GeO_2$ | | | | | | | | | | |
| Total(%) | 100 | 100 | 100 | 100 | 100 | 100 | 100 | 100 | 100 | 100 |
| F | 4.48 | 4.48 | 4.48 | 4.48 | 4.48 | 4.48 | 4.48 | 4.48 | 4.48 | 9.19 |
| $(Y_2O_3 + Gd_2O_3 + Yb_2O_3)/La_2O_3$ | 1.03 | 0.91 | 0.86 | 0.84 | 1.26 | 0.61 | 0.91 | 0.61 | 0.97 | 0.56 |
| $(Li_2O + ZnO)/SiO_2$ | 0.62 | 0.44 | 0.44 | 0.44 | 0.44 | 0.44 | 0.44 | 0.44 | 0.44 | 0.44 |
| $SiO_2 + B_2O_3 + La_2O_3 + Gd_2O_3 + Li_2O + ZrO_2 + Yb_2O_3 + ZnO$ | 94.93 | 98.72 | 98.72 | 99.96 | 99.96 | 99.96 | 99.96 | 99.96 | 99.96 | 99.96 |
| $n_d$ | 1.783 | 1.782 | 1.778 | 1.783 | 1.780 | 1.782 | 1.774 | 1.778 | 1.762 | 1.760 |
| $v_d$ | 49.8 | 50.5 | 51.1 | 50.3 | 50.5 | 50.6 | 51.0 | 50.5 | 53.1 | 53.6 |
| $T_g$ (° C.) | 629 | 641 | 639 | 641 | 643 | 640 | 639 | 642 | 640 | 615 |
| Inclusions rating(Class) | 1 | 1 | 1 | 1 | 1 | 1 | 1 | 1 | 1 | 1 |

TABLE 3

| | Example No. | | | | | | | | | |
|---|---|---|---|---|---|---|---|---|---|---|
| | 21 | 22 | 23 | 24 | 25 | 26 | 27 | 28 | 29 | 30 |
| $SiO_2$ | 2.74 | 2.81 | 2.81 | 2.81 | 5.97 | 2.74 | 5.82 | 5.82 | 5.82 | 5.82 |
| $B_2O_3$ | 22.89 | 23.50 | 26.66 | 18.23 | 20.34 | 25.97 | 22.89 | 22.89 | 22.89 | 22.89 |
| $La_2O_3$ | 36.47 | 47.47 | 42.16 | 47.47 | 47.47 | 32.58 | 32.58 | 32.06 | 31.55 | 35.65 |
| $Gd_2O_3$ | 15.07 | 12.31 | 10.21 | 12.31 | 12.31 | 15.07 | 15.07 | 15.07 | 15.07 | 15.07 |
| $Yb_2O_3$ | 15.39 | 12.64 | 10.53 | 12.64 | 12.64 | 15.39 | 15.39 | 15.39 | 15.39 | 15.39 |
| $TiO_2$ | | | | | | | | | | |
| $ZrO_2$ | 6.20 | | 6.36 | | | 6.20 | 6.20 | 6.20 | 6.20 | 3.12 |
| $Nb_2O_5$ | | | | | | | | | | |
| $Ta_2O_5$ | | | | | | | | | | |
| $WO_3$ | | | | | | | | | | |
| ZnO | 1.00 | 1.02 | 1.02 | 1.02 | 1.02 | 1.00 | 1.00 | 1.00 | 1.00 | 1.00 |
| CaO | | | | | | | | | | |
| SrO | | | | | | | | | | |
| BaO | | | | | | | | | | |
| $Li_2O$ | 0.21 | 0.21 | 0.21 | 0.21 | 0.21 | 1.03 | 1.03 | 1.54 | 2.05 | 1.03 |
| $Sb_2O_3$ | 0.04 | 0.04 | 0.04 | 0.04 | 0.04 | 0.04 | 0.04 | 0.04 | 0.04 | 0.04 |
| $GeO_2$ | | | | 5.27 | | | | | | |
| Total(%) | 100 | 100 | 100 | 100 | 100 | 100 | 100 | 100 | 100 | 100 |
| F | 4.48 | 9.19 | 9.19 | 9.19 | 9.19 | 4.48 | 4.48 | 4.48 | 4.48 | 4.48 |
| $(Y_2O_3 + Gd_2O_3 + Yb_2O_3)/La_2O_3$ | 0.84 | 0.53 | 0.49 | 0.53 | 0.53 | 0.94 | 0.94 | 0.95 | 0.97 | 0.85 |
| $(Li_2O + ZnO)/SiO_2$ | 0.44 | 0.44 | 0.44 | 0.44 | 0.21 | 0.74 | 0.35 | 0.44 | 0.52 | 0.35 |
| $SiO_2 + B_2O_3 + La_2O_3 + Gd_2O_3 + Li_2O + ZrO_2 + Yb_2O_3 + ZnO$ | 99.96 | 99.96 | 99.96 | 94.69 | 99.96 | 99.96 | 99.96 | 99.96 | 99.96 | 99.96 |
| $n_d$ | 1.789 | 1.767 | 1.776 | 1.773 | 1.761 | 1.766 | 1.762 | 1.757 | 1.752 | 1.757 |
| $v_d$ | 50.2 | 52.9 | 51.5 | 51.5 | 53.1 | 51.2 | 51.1 | 51.3 | 51.6 | 52.4 |
| $T_g$ (° C.) | 642 | 620 | 624 | 625 | 618 | 599 | 600 | 597 | 571 | 602 |
| Inclusions rating(Class) | 1 | 1 | 1 | 1 | 1 | 1 | 1 | 1 | 1 | 1 |

TABLE 4

| | Example No. | | | | | | | | | |
|---|---|---|---|---|---|---|---|---|---|---|
| | 31 | 32 | 33 | 34 | 35 | 36 | 37 | 38 | 39 | 40 |
| $SiO_2$ | 5.82 | 5.82 | 5.82 | 5.82 | 7.87 | 5.82 | 5.82 | 5.82 | 5.82 | 5.82 |
| $B_2O_3$ | 22.89 | 20.84 | 20.84 | 22.89 | 20.84 | 20.84 | 20.84 | 20.84 | 20.84 | 20.84 |
| $La_2O_3$ | 27.45 | 34.12 | 37.71 | 35.14 | 35.65 | 31.12 | 29.12 | 29.12 | 29.12 | 29.12 |
| $Gd_2O_3$ | 15.07 | 15.07 | 15.07 | 15.07 | 15.07 | 15.07 | 15.07 | 15.07 | 15.07 | 15.07 |
| $Yb_2O_3$ | 15.39 | 15.39 | 15.39 | 15.39 | 15.39 | 15.39 | 15.39 | 15.39 | 15.39 | 15.39 |
| $TiO_2$ | | | | | | | | | | |
| $ZrO_2$ | 6.20 | 6.20 | 3.12 | 3.12 | 3.12 | 6.20 | 6.20 | 6.20 | 6.20 | 6.20 |
| $Nb_2O_5$ | | | | | | 3.00 | | | | |
| $Ta_2O_5$ | | | | | | | | | | |
| $WO_3$ | | | | | | | | 5.00 | | |
| ZnO | 6.12 | 1.00 | 1.00 | 1.00 | 1.00 | 1.00 | 1.00 | 1.00 | 1.00 | 1.00 |
| CaO | | | | | | | | 5.00 | | |
| SrO | | | | | | | | | 5.00 | |
| BaO | | | | | | | | | | 5.00 |
| $Li_2O$ | 1.03 | 1.54 | 1.03 | 1.54 | 1.03 | 1.54 | 1.54 | 1.54 | 1.54 | 1.54 |
| $Sb_2O_3$ | 0.04 | 0.04 | 0.04 | 0.04 | 0.04 | 0.04 | 0.04 | 0.04 | 0.04 | 0.04 |
| $GeO_2$ | | | | | | | | | | |
| Total(%) | 100 | 100 | 100 | 100 | 100 | 100 | 100 | 100 | 100 | 100 |
| F | 4.48 | 4.48 | 4.48 | 4.48 | 4.48 | 4.48 | 4.48 | 4.48 | 4.48 | 4.48 |
| $(Y_2O_3 + Gd_2O_3 + Yb_2O_3)/La_2O_3$ | 1.11 | 0.89 | 0.81 | 0.87 | 0.85 | 0.98 | 1.05 | 1.05 | 1.05 | 1.05 |
| $(Li_2O + ZnO)/SiO_2$ | 1.23 | 0.44 | 0.35 | 0.44 | 0.26 | 0.44 | 0.44 | 0.44 | 0.44 | 0.44 |
| $SiO_2 + B_2O_3 + La_2O_3 + Gd_2O_3 + Li_2O + ZrO_2 + Yb_2O_3 + ZnO$ | 99.96 | 99.96 | 99.96 | 99.96 | 99.96 | 96.96 | 94.96 | 94.96 | 94.96 | 94.96 |
| $n_d$ | 1.755 | 1.769 | 1.769 | 1.753 | 1.751 | 1.776 | 1.768 | 1.761 | 1.761 | 1.761 |
| $v_d$ | 51.1 | 50.8 | 51.5 | 52.4 | 51.9 | 48.5 | 49.1 | 50.7 | 50.7 | 50.7 |
| $T_g$ (° C.) | 585 | 579 | 599 | 588 | 604 | 583 | 575 | 570 | 571 | 568 |
| Inclusions rating(Class) | 1 | 1 | 1 | 1 | 1 | 1 | 1 | 1 | 1 | 1 |

TABLE 5

| | Example No. | | | | | | | |
|---|---|---|---|---|---|---|---|---|
| | 41 | 42 | 43 | 44 | 45 | 46 | 47 | 48 |
| $SiO_2$ | 2.92 | 5.46 | 2.41 | 2.41 | 2.72 | 2.43 | 2.74 | 2.74 |
| $B_2O_3$ | 25.64 | 22.69 | 25.74 | 25.74 | 25.74 | 25.97 | 25.97 | 25.97 |
| $La_2O_3$ | 30.21 | 30.21 | 33.27 | 31.74 | 30.21 | 29.61 | 33.40 | 35.45 |
| $Gd_2O_3$ | 30.20 | 30.20 | 30.20 | 30.20 | 30.20 | 30.46 | 30.46 | 30.46 |
| $Yb_2O_3$ | | | | | | | | |
| $TiO_2$ | | | | | | | | |
| $ZrO_2$ | 6.14 | 6.14 | 3.09 | 6.14 | 6.14 | 6.20 | 6.20 | 4.14 |
| $Nb_2O_5$ | | | | | | | | |
| $Ta_2O_5$ | 3.75 | 3.75 | 3.75 | 2.23 | 3.75 | 3.79 | | |
| $WO_3$ | | | | | | | | |
| ZnO | 0.99 | 0.99 | 0.99 | 0.99 | 0.99 | 1.00 | 1.00 | 1.00 |
| CaO | | | | | | | | |
| SrO | | | | | | | | |
| BaO | | | | | | | | |
| $Li_2O$ | 0.10 | 0.51 | 0.51 | 0.51 | 0.20 | 0.51 | 0.21 | 0.21 |
| $Sb_2O_3$ | 0.04 | 0.04 | 0.04 | 0.04 | 0.04 | 0.04 | 0.04 | 0.04 |
| $GeO_2$ | | | | | | | | |
| Total(%) | 100 | 100 | 100 | 100 | 100 | 100 | 100 | 100 |
| F | 2.96 | 2.96 | 2.96 | 2.96 | 2.96 | 4.48 | 4.48 | 4.48 |
| $(Y_2O_3 + Gd_2O_3 + Yb_2O_3)/La_2O_3$ | 1.00 | 1.00 | 0.91 | 0.95 | 1.00 | 1.03 | 0.91 | 0.86 |
| $(Li_2O + ZnO)/SiO_2$ | 0.37 | 0.27 | 0.62 | 0.62 | 0.44 | 0.62 | 0.44 | 0.44 |
| $SiO_2 + B_2O_3 + La_2O_3 + Gd_2O_3 + Li_2O + ZrO_2 + Yb_2O_3 + ZnO$ | 96.20 | 96.21 | 96.21 | 97.73 | 96.21 | 96.17 | 99.96 | 99.96 |
| $n_d$ | 1.790 | 1.786 | 1.783 | 1.786 | 1.787 | 1.783 | 1.782 | 1.778 |
| $v_d$ | 49.0 | 49.1 | 50.1 | 49.8 | 49.1 | 49.8 | 50.5 | 51.1 |
| $T_g$ (°C.) | 665 | 645 | 635 | 638 | 652 | 629 | 641 | 639 |
| Inclusions rating(Class) | 1 | 1 | 1 | 1 | 1 | 1 | 1 | 1 |

TABLE 6

| | Example No. | | | | |
|---|---|---|---|---|---|
| | 49 | 50 | 51 | 52 | 53 |
| $SiO_2$ | 5.82 | 5.82 | 5.82 | 5.82 | 5.82 |
| $B_2O_3$ | 23.91 | 23.91 | 23.91 | 23.91 | 23.91 |
| $La_2O_3$ | 34.63 | 34.63 | 34.63 | 34.63 | 34.63 |
| $Gd_2O_3$ | 15.07 | 15.07 | 15.07 | 15.07 | 15.07 |
| $Yb_2O_3$ | 15.39 | 15.39 | 15.39 | 15.39 | 15.39 |
| $TiO_2$ | | | | | |
| $ZrO_2$ | 3.12 | 3.12 | 3.12 | 3.12 | 3.12 |
| $Nb_2O_5$ | | | | | |
| $Ta_2O_5$ | | | | | |
| $WO_3$ | | | | | |
| ZnO | 1.00 | 1.00 | 1.00 | 1.00 | 1.00 |
| CaO | | | | | |
| SrO | | | | | |
| BaO | | | | | |
| $Li_2O$ | 1.03 | 1.03 | 1.03 | 1.03 | 1.03 |
| $Sb_2O_3$ | 0.04 | 0.04 | 0.04 | 0.04 | 0.04 |
| $GeO_2$ | | | | | |
| Total(%) | 100 | 100 | 100 | 100 | 100 |
| F | 4.48 | 4.00 | 3.70 | 3.50 | 3.30 |
| $(Y_2O_3 + Gd_2O_3 + Yb_2O_3)/La_2O_3$ | 0.88 | 0.88 | 0.88 | 0.88 | 0.88 |
| $(Li_2O + ZnO)/SiO_2$ | 0.35 | 0.35 | 0.35 | 0.35 | 0.35 |
| $SiO_2 + B_2O_3 + La_2O_3 + Gd_2O_3 + Li_2O + ZrO_2 + Yb_2O_3 + ZnO$ | 99.96 | 99.96 | 99.96 | 99.96 | 99.96 |
| $n_d$ | 1.750 | 1.750 | 1.751 | 1.751 | 1.751 |
| $v_d$ | 52.9 | 52.8 | 52.7 | 52.6 | 52.6 |
| $T_g$ (°C.) | 608 | 610 | 613 | 615 | 618 |
| Inclusions rating(Class) | 1 | 1 | 1 | 1 | 1 |

TABLE 7

| | Comparative Example No. | | | | | |
|---|---|---|---|---|---|---|
| | A | B | C | D | E | F |
| $SiO_2$ | 3.62 | 12.20 | 10.59 | 5.50 | 7.00 | |
| $B_2O_3$ | 32.43 | 8.14 | 18.15 | 23.60 | 23.20 | 24.50 |
| $Al_2O_3$ | | | 5.09 | | | |
| $Y_2O_3$ | | | | 5.04 | | |
| $La_2O_3$ | 28.69 | 49.14 | 43.53 | 43.40 | 24.60 | 42.82 |
| $Gd_2O_3$ | 26.96 | | | 10.00 | 31.50 | 20.42 |
| $Yb_2O_3$ | 2.00 | 25.43 | 15.13 | | | |

TABLE 7-continued

|  | Comparative Example No. | | | | | |
|---|---|---|---|---|---|---|
|  | A | B | C | D | E | F |
| $ZrO_2$ | 5.80 |  | 7.56 | 7.10 | 5.20 |  |
| $Nb_2O_5$ | 0.40 |  |  |  |  |  |
| $Ta_2O_5$ |  |  |  | 8.50 | 7.70 | 4.09 |
| $WO_3$ |  |  |  | 0.50 |  | 4.09 |
| ZnO |  |  |  | 1.40 |  |  |
| MgO |  |  |  |  |  | 2.45 |
| $Li_2O$ | 0.10 |  |  |  |  | 1.63 |
| $Na_2O$ |  |  |  |  | 0.30 |  |
| $K_2O$ |  |  |  |  | 0.50 |  |
| Total(%) | 100 | 100 | 100 | 100 | 100 | 100 |
| F |  | 2.96 | 1.47 |  |  | 5.04 |
| $(Y_2O_3 + Gd_2O_3 + Yb_2O_3)/La_2O_3$ | 1.01 | 0.52 | 0.46 | 0.23 | 1.28 | 0.48 |
| $(Li_2O + ZnO)/SiO_2$ | 0.03 | 0.00 | 0.00 | 0.25 | 0.00 | — |
| $SiO_2 + B_2O_3 + La_2O_3 + Gd_2O_3 + Li_2O + ZrO_2 + Yb_2O_3 + ZnO$ | 99.60 | 94.91 | 94.96 | 91.00 | 91.50 | 89.37 |
| $n_d$ | 1.751 | 1.778 | 1.782 | 1.797 | no vitrification | no vitrification |
| $v_d$ | 51.5 | 50.7 | 49.3 | 46.6 |  |  |
| $T_g$ (° C.) | 685 | 695 | 682 | 684 |  |  |
| Inclusions rating(Class) | 4 | 5 | 5 | 4 |  |  |

Optical glasses (Example No. 1 to No. 53) shown in Tables 1 to 6 were manufactured by weighing and mixing ordinary raw material for an optical glass such as oxides, hydroxides, carbonates, nitrates and fluorides in ratios of the respective examples shown in Tables 1 to 6, placing the mixed materials in a platinum crucible, melting them at a temperature within a range from 1100° C. to 1300° C. for three to five hours depending upon melting property of the composition and, after refining and stirring for homogenization, casting the melt into a mold and annealing it.

Refractive index (nd) and Abbe number (vn) were measured on optical glasses obtained by setting the annealing speed at −25° C. per hour.

The glass transition temperature (Tg) was measured by the method described in Japan Optical Glass Industry Standard JOGIS08-2003 (Measuring method for thermal expansion of optical glass). As a test piece, specimens having length of 50 mm and diameter of 4 mm were used.

Rating of inclusions was made by conducting classification on the basis of sum of cross sections of inclusions contained in glass of 100 ml shown in Table 1 of Japan Optical Glass Industry Standard JOGIS12-1994 (Measuring method for inclusions in optical glass). "Inclusions" in the Standard are fine crystals e.g., devitrification and platinum fine crystals, fine bubbles and other similar matters. Class 1 is a rating given to an optical glass in which the sum of cross sections of inclusions is less than 0.03 $mm^2$. Class 2 is a rating given to an optical glass in which the sum of cross sections of inclusions is within a range from 0.03 $mm^2$ to less than 0.1 $mm^2$. Class 3 is a rating given to an optical glass in which the sum of cross sections of inclusions is within a range from 0.1 $mm^2$ to less than 0.25 $mm^2$. Class 4 is a rating given to an optical glass in which the sum of cross sections of inclusions is within a range from 0.25 $mm^2$ to less than 0.5 $mm^2$. Class 5 is a rating given to an optical glass in which the sum of cross sections of inclusions is 0.5 $mm^2$ or over.

As shown in Tables 1 to 6, the optical glasses of the examples of the present invention (No. 1 to No. 53) all have the optical constants (refractive index (nd) and Abbe number (vn)) within the specific range and have glass transition temperature (Tg) within a range from 530° C. to 680° C. and, therefore, are suitable for reheat press molding or precision press molding. Moreover, the optical glasses of these examples all have excellent foreign matter rating and therefore have excellent internal quality.

In contrast, the specimens of Comparative Example Nos. A to F were manufactured under the same conditions as in the examples of the present invention except that the specimens of Comparative Example Nos. A to E were melted at a temperature within a range from 1200° C. to 1400° C. and the specimen of Comparative Example No. F was melted at a temperature within the same range as the examples of the present invention, i.e., 1100° C. to 1300° C. and the properties of these comparative examples were measured by the same method as in the examples of the present invention. The optical glasses of Comparative Example Nos. A to D have glass transition temperature (Tg) exceeding 680° C. and therefore it is difficult to use these optical glasses for precision press molding. The optical glasses of Comparative Example Nos. B and C are given Class 5 in the foreign matter rating and therefore fail to satisfy the properties required in the present invention. The compositions of Comparative Example Nos. E and F were crystallized when the glass melt was cast into the mold and hence glass could not be obtained under the above described conditions and it was impossible to measure the properties of the glass.

Industrial Utility

As described in the foregoing, the optical glass of the present invention is a $SiO_2$—$B_2O_3$—$La_2O_3$—$Gd_2O_3$—$Li_2O$—F glass which is substantially free of $As_2O_3$ and has the above described specific range of optical constants, i.e., within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C, and has glass transition temperature (Tg) within a range from 530° C. to 680° C. Therefore, the optical glass of the present invention is suitable for reheat press molding and precision press molding and hence has sufficient industrial utility.

Further, since the optical glass of the present invention has excellent internal quality with respect to inclusions and bubbles, it has a high yield and hence a high productivity.

The present invention has been described in detail for illustrative purpose but it will be appreciated that the examples of the present invention have been described for illustrative purpose only and many modifications can be made by those skilled in the art without departing from the spirit and scope of the invention.

The invention claimed is:

1. An optical glass having a refractive index (nd) and Abbe number (vd) within a range enclosed with a border line consisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for the straight line connecting the point A with the point D and the straight line connecting the point B with the point C, comprising, as essential components, $SiO_2$, $B_2O_3$, $La_2O_3$, $Gd_2O_3$, $Li_2O$ and F, and being substantially free of $As_2O_3$, the total amount of $SiO_2$, $B_2O_3$, $La_2O_3$, $Gd_2O_3$, $Li_2O$, $ZrO_2$, $Yb_2O_3$, and ZnO is 94mass % or over and comprising not more than 2% of $Y_2O_3$.

2. An optical glass having a composition which comprises, calculated on oxide basis and expressed in mass %,

| | |
|---|---|
| $SiO_2$ | 0.1-less than 10% |
| $B_2O_3$ | 15-35% |
| $La_2O_3$ | 15-55% |
| $Gd_2O_3$ | 1-40% and |
| $Li_2O$ | 0.1-less than 3% and |
| $Y_2O_3$ | 0-2% and/or |
| $Yb_2O_3$ | 0-25% and/or |
| $GeO_2$ | 0-10% and/or |
| $TiO_2$ | 0-5% and/or |
| $ZrO_2$ | 0-10% and/or |
| $Nb_2O_5$ | 0-5% and/or |
| $Ta_2O_5$ | 0-10% and/or |
| $WO_3$ | 0-10% and/or |
| ZnO | 0-15% and/or |
| RO | 0-10% where RO is one or more oxides selected from the group consisting of CaO, SrO and BaO and/or |
| $Sb_2O_3$ | 0-1% | and a fluoride or fluorides oVa metal element or elements contained in the above oxide; a total amount ofF contained in the fluoride or fluorides being 0.1-10 weight parts to 100 weight parts of said composition calculated on oxide basis, and being substantially free of $As_2O_3$.

3. An optical glass having a composition which comprises, calculated on the basis of all atoms constituting said composition and expressed in mol %,

| | |
|---|---|
| Si | 0.1-6 mol % |
| B | 12-32 mol % |
| La | 2-12 mol % |
| Gd | 0.2-8 mol % |
| Li | 0.1-6.5 mol % and |
| O | 40-65 mol % and |
| Y | 0-1 mol % and/or |
| Yb | 0-6 mol % and/or |
| Ge | 0-3.5 mol % and/or |
| Ti | 0-2 mol % and/or |
| Zr | 0-3 mol % and/or |
| Nb | 0-1 mol % and/or |
| Ta | 0-1.5 mol % and/or |
| W | 0-1.5 mol % and/or |
| Zn | 0-6 mol % and/or |
| Ca | 0-6 mol % and/or |
| Sr | 0-4 mol % and/or |
| Ba | 0-3 mol % and/or |
| Sb | 0-0.2 mol % and |
| F | 0.1-20 mol % and being substantially free of As. |

4. An optical glass as defined in claim 2 having a refractive index (nd) and Abbe number (vd) within a range enclosed with a border line cousisting of straight lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on the border line except for tbe straight line connecting the point A with the point D and the straight line connecting the point B with the point C.

5. An optical glass as defined in claim 3 having a refractive index (ud) and Abbe number (vd) within a range enclosed with a border line consisting of straigbt lines connecting point A (nd being 1.75 and vd being 50.0), point B (nd being 1.80 and vd being 46.0), point C (nd being 1.80 and vd being 50.0) and point D (nd being 1.75 and vd being 56.0) in the order of the point A, the point B, the point C, the point D and the point A in x-y rectangular coordinates in which x coordinate represents Abbe number (vd) and y coordinate represents refractive index (nd), including refractive index (nd) and Abbe number (vd) on. the border line except for the straight line connecting the point A with the point D and the straight line connecting the point B with the point C.

6. An optical glass as defined in any of claims 1-5 wherein a value of $(Y_2O_3+Gd_2O_3+Yb_2O_3)/La_2O_3$ ($Y_2O_3$, $Gd_2O_3$, $Yb_2O_3$ and $La_2O_3$ in the formula representing amounts of the respective components calculated on oxide basis and expressed in mass %) is within a range from 0.4 to 2 and a value of $(Li_2O+ZnO)SiO_2$ ($Li_2O$, ZnO and $SiO_2$ in the formula representing amounts of the respective components calculated on oxide basis and expressed in mass %) is within a range from 0.05 to 7 and a total amount of $SiO_2$, $B_2O_3$, $La_2O_3$, $Gd_2O_3$, $Li_2O$, $ZrO_2$, $Yb_2O_3$ and ZnO is 94 mass or over.

7. An optical glass as defined in any of claim 1-5 wherein glass transition temperature (Tg) is within a range from 530° C. to 680° C.

8. An optical glass as defined in claim 6 wherein glass transition temperature (Tg) is within a range from 530° C. to 680° C.

9. An optical glass as defined in any of claim 1-5 wherein glass transition temperature (Tg) is within a range from 530° C. to 660° C.

10. An optical glass as defined ip claim 6 wherein glass transition temperature (Tg) is within a range from 530° C. to 660° C.

11. An optical glass as defined in any of claim 1-5 wherein glass transition temperature (Tg) is within a range from 530° C. to 630° C.

12. An optical glass as defined in claim 6 wherein glass transition temperature (Tg) is within a range from 530° C. to 630° C.

13. An optical glass as defined in any of claim 1-5 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

14. An optical glass as defined in claim 6 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Method of measuring inclusions in optical glass) is Class 1 to Class 4.

15. An optical glass as defined in claim 7 wherein sum of cross sections of foams contained in glass of 100 ml shown in Table 1 of Japan Optical Glass Industry Standard JOGIS32-1994 (Measuring method for bubbles in optical glass) is Class 1 to Class 4 and sum of cross sections of inclusions contained in glass of 100 ml shown in Table 1 of Japan Optical Glass Industry Standard JOGIS 12-1994 (Measuring method for inclusions in optical glass) is Class 1 to Class 4.

16. An optical glass as defined in claim 8 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

17. An optical glass as defined in claim 9 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

18. An optical glass as defined in claim 10 wherein sum of cross sections of foams contained in glass of 100 ml shown in Table 1 of Japan Optical Glass Industry Standard JOGIS12-1994 (Measuring method for bubbles in optical glass) is Class 1 to Class 4 and suni of cross sections of inclusions contained in glass of 100 ml shown in Table 1 of Japan Optical Glass Industry Standard JOGIS12-1994 (Measuring method for inclusions in optical glass) is Class 1 to Class 4.

19. An optical glass as defined in claim 11 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

20. An optical glass as defined in claim 12 wherein sum of cross sections of foams contained in glass of 100 ml shown in Table 1 of Japan Optical Glass Industry Standard JOGIS12-1994 (Measuring method for bubbles in optical glass) is Class 1 to Class 4 and sum of cross sections of inclusions contained in glass of 100 ml shown in Table 1 of Japan Optical Glass Industry Standard JOGIS12-1994 (Measuring method for inclusions in optical glass) is Class 1 to Class 4.

21. A lens preform made of an optical glass as definod in any of claims 1-5.

22. A lens preform made of an optical glass as defined in claim 6.

* * * * *